United States Patent [19]

Becker et al.

[11] Patent Number: 5,072,073
[45] Date of Patent: Dec. 10, 1991

[54] CABLE SEALING METHOD AND APPARATUS

[75] Inventors: William L. Becker, Laramie, Wyo.;
Charles B. McKee, Jr., Fort Collins, Colo.

[73] Assignee: In-Situ, Inc., Laramie, Wyo.

[21] Appl. No.: 585,002

[22] Filed: Sep. 19, 1990

[51] Int. Cl.⁵ .................... H01B 13/32; H02G 15/04
[52] U.S. Cl. ........................... 174/76; 156/48;
174/23 R; 174/75 R; 174/77 R; 277/1
[58] Field of Search ............. 174/76, 74 R, 77 R,
174/75 R, 23 R, 23 C; 73/299, 301; 156/48

[56] References Cited

U.S. PATENT DOCUMENTS

| Re. 30,715 | 8/1981 | Woytiuk | 174/23 C |
|---|---|---|---|
| 3,290,194 | 12/1966 | Gillemot | 156/48 |
| 3,823,250 | 7/1974 | DeMonsy et al. | 174/23 R |
| 3,875,323 | 4/1975 | Bopp et al. | 156/48 |
| 3,996,413 | 12/1976 | Foord et al. | 174/23 C |
| 4,335,608 | 6/1982 | Wood et al. | 73/301 |
| 4,451,692 | 5/1984 | Classens et al. | 156/48 X |
| 4,484,022 | 11/1984 | Eilentropp | 174/84 |
| 4,533,418 | 8/1985 | Appling | 156/52 |
| 4,902,855 | 2/1990 | Smith | 174/77 R |
| 4,942,764 | 7/1990 | Dews et al. | 73/301 |
| 4,961,961 | 10/1990 | Vincent et al. | 156/48 X |
| 4,963,695 | 10/1990 | Marciano-Agostinelli et al. | 174/23 C |

Primary Examiner—Morris H. Nimmo
Attorney, Agent, or Firm—Sheridan Ross & McIntosh

[57] ABSTRACT

Method and apparatus are provided for sealing an open end of a sheathed cable. After removing a length of insulating jacket, the open end of the cable is placed in a pressure block and a viscous sealant material is injected into the block and into the open end of the cable. After injection, the cable is removed from the block and the sealant allowed to cure to a gel-like consistency. Fluid which may invade the interior of the cable above the seal is, therefore, prevented from passing by the seal and entering a transducer or other instrument secured to the end of the cable. In the preferred embodiment, a cable head, O-ring and transducer body are also provided to enclose the transducer in a substantially waterproof housing.

12 Claims, 2 Drawing Sheets

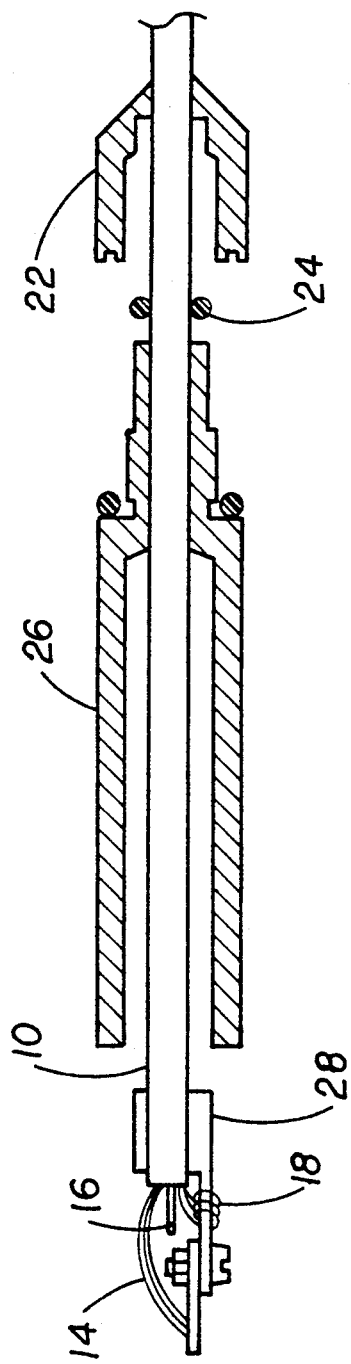
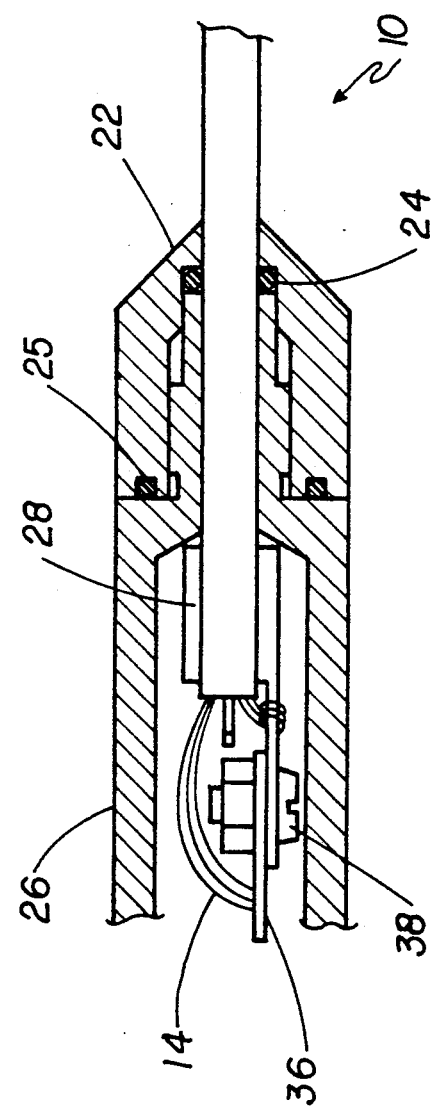

CABLE SEALING METHOD AND APPARATUS

TECHNICAL FIELD

This invention relates to the protection from fluids of a device coupled to the end of a cable, and more particularly, to method and apparatus by which water which has invaded the interior of the cable is substantially prevented from flowing through the end of the cable into a transducer for sensing one or more parameters.

BACKGROUND OF THE INVENTION

Transducers, sensors and other like instruments are frequently coupled to the end of long cables and inserted into well holes (such as those drilled into an aquifer for the production of water). (As used in the specification and the Claims to follow, the term "transducer" shall include, without limitation, transducers, sensors, and other like instruments used to obtain the measurement of one or more parameters from the surrounding environment.) For example, it is useful to know how the pressure near the bottom of a well varies over long periods of time because such variations can be used to determine fluctuations in the level of an aquifer.

Generally, the cable comprises one or more insulated conductors, usually surrounded by a braided metallic shielding, all of which are encased in an insulating jacket. In addition, a hollow vent tube may be inserted through the center of the cable to maintain the lower end of the cable at atmospheric pressure. Furthermore, a filler material, such as Kevlar, may be used inside the shielded braid and between the insulated conductors. A waterproof, pressure tight transducer, such as a pressure sensor, can be coupled in a water tight manner to the conductors at the end of the cable. The Kevlar fibers, running the entire length of the cable, absorb strain on the cable when it is raised or lowered and prevent the cable from stretching so much that the conductor wires are pulled from their connection with the transducer.

When a transducer and cable are lowered into a well, the insulating jacket may be subjected to abrasion, sharp well casing edges and joints, and sharp rocks if no casing is used, any of which may cause the cable jacket to be pierced, ripped or otherwise opened. As a result, water or other fluids may enter the cable, travel through the interior of the cable and leak into the transducer housing where the electrical and mechanical elements found there can be damaged or destroyed.

It is also known that fluid will seep through an insulating jacket which has been left in the fluid, such as water, for a long period of time. Thus, even if the jacket is not physically damaged during repeated lowering and raising operations, if the cable is left in place on a long term or permanent basis, the fluid will eventually seep into the interior of the cable and travel through the cable and into the transducer housing where damage can occur.

Known sealing methods are generally directed toward preventing water from entering the transducer housing at the point where the cable enters the housing. For example, U.S. Pat. No. 4,533,418, issued to Appling on Aug. 6, 1985, discloses a method of bonding a metal termination member to an electrical cable which has an internal armor layer and an external polyurethane jacket. The external jacket is split longitudinally and peeled away from the cable. The electrical wires of the cable are connected to the termination member as is the armor layer. The armor layer is then primed with a thermoplastic adhesive which adheres to both metal and polyurethane, and the split jacket repositioned over the cable and termination member. The entire assembly is then heated and compressed such that the polyurethane jacket flows sufficiently to bond the split halves together and to the termination member.

A disadvantage of such a method is that it will not prevent water which enters the cable above the bonding area from traveling through the interior of the cable into the termination member. Furthermore, it can only be used with an insulating jacket made of a flowable material such as polyurethane. It cannot easily be used with a more modern jacket material, Teflon, which melts at a much higher temperature than polyurethane and which has the advantage of being chemically inert.

U.S. Pat. No. 4,484,022, issued by Eilentropp on Nov. 20, 1984, discloses a method of making tensile-, pressure- and moisture-proof connections. To connect two insulated wires, a length of insulation is removed from the end of each wire and the exposed conductors are placed in opposite ends of a metal conductor sleeve. The connected wires and conductor sleeve fit inside an annular element (such as another sleeve) and a somewhat smaller, annular preformed filler is inserted in the annular element around the wires and conductor sleeve. Annular plungers surrounding the wires are inserted into each end of the annular element and the entire apparatus is heated causing the filler to melt. When the plungers are pressed into the annular element, they compress the melted filler causing it to flow and fill all of the empty spaces inside the annular element. According to the disclosure, the resulting connection, when cooled, provides a waterproof seal. In a similar fashion, the disclosed method can be used for terminating electrical conductors; a single plunger would be used instead of two.

The foregoing method does not utilize a sealant injection technique. Nor does it require that the sealant be injected along the conductors and past the sleeve.

Also known are methods whereby a liquid material is injected through the insulating jacket at numerous points along the cable and the material, when hardened or cured, becomes a water or pressure barrier inside of the cable. For example, U.S. Pat. No. 3,290,194, issued to Gillemont on Dec. 6, 1966, discloses a process and apparatus for injecting fluids into a sheathed cable. To use the device, a portion of the outer covering of the cable is removed, preferably around the entire circumference at the point at which the injection is to occur. It is also suggested that portions from the interior of the cable, such as metal sheath, be removed to expose the cable core. A nozzle is inserted into the opening and the device secured in place. The desired sealing fluid is then injected into the interior of the cable and the fluid allowed to harden. Once the source of the fluid is disconnected from the nozzle, the nozzle is left in place and its opening capped to prevent fluid from leaking back out.

Such a method and apparatus present an obvious disadvantage in that the cable sheath is breached, in this case, partially removed, thereby creating an opportunity for eventual water invasion. The nozzle of the Gillemont patent remains in place with at least a portion remaining attached to the exterior of the cable. This may present difficulties in lowering and raising the cable into and out of a hole and, further, such projections may have a tendency to become caught in a well hole with resulting damage to the cable or the seal. Furthermore, if a two-part sealant is used, air bubbles tend to form when the two parts are mixed. If the bubbles are not removed prior to injection (such as by applying a vacuum to the sealant), they will reduce the effectiveness of the plug. Finally, the use of Teflon sheathing, because of its non-adhesive properties, may prevent a watertight seal where the device is secured.

Consequently, a need has arisen for providing a seal internal to the cable which prevents fluid from infiltrating into a transducer body through the interior of the cable.

SUMMARY OF THE INVENTION

In accordance with the present invention, apparatus and method are provided to internally seal end portions of a cable before a transducer is attached thereby substantially preventing fluid from entering the transducer body through the interior of the cable. Additionally, a seal is provided where the cable enters the transducer body to substantially prevent fluid from entering the transducer body through such entry.

In order to seal the end portions of the cable, the cable is secured in a pressure block and a sealant is injected into the open end of the cable and along end portions thereof. The sealant flows for a predetermined distance into the cable, the distance being dependent upon the viscosity of the sealant, the pressure with which it is injected and the length of time pressure is applied. The cable is then removed from the pressure block and the sealant allowed to cure. In the preferred embodiment, the sealant is a silicone gel which, in its uncured state, is very fluid and, in its cured state, has a gel-like consistency allowing it to flex with the cable but still reduce the passage for fluid. Use of the preferred gel has the further advantage that it substantially reduces the number of air bubbles in the cured state.

After the sealant has cured, a cable head is threaded onto the transducer body with an O-ring positioned between the two to substantially insure that water does not leak into the transducer through the opening for the cable.

Because the sealant is injected through the open end of the cable, rather than through a hole in the jacket wall, the insulating jacket remains intact. Because the sealant is injected before a transducer is attached, any size transducer may be accommodated. And, because the preferred sealant used "self-removes" substantially all of the air bubbles which may form, the resulting plug does not contain any voids or holes which would affect the integrity of the seal.

Thus, the method and apparatus of the present invention provide the technical advantage of substantially preventing fluid from entering into the transducer body either through the interior of the cable itself or through the junction of the cable and the transducer body.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a cutaway representation of the transducer body, O-ring and cable head of the present invention;

FIG. 4 illustrates an assembled cable end of the present invention.

DETAILED DESCRIPTION OF THE INVENTION

The preferred embodiment of the present invention is best understood by referring to FIGS. 1 through 4 of the drawings, like numerals being used for like and corresponding parts of the various drawings.

Figure 1:
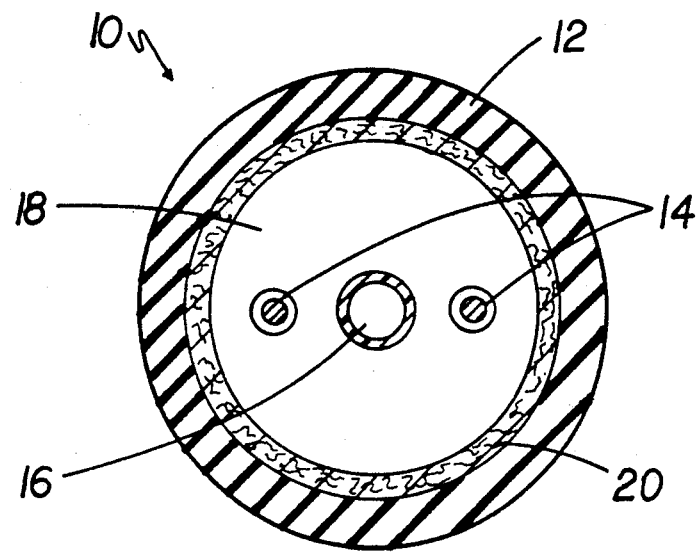
FIG. 1 illustrates a cross-section of a transducer cable.

FIG. 1 illustrates a cross-section of a typical transducer cable 10. The outside of cable 10 comprises an insulating jacket 12 which defines the interior of cable 10. One or more insulated conductor wires 14 run through the entire length of cable 10 along with a vent tube 16 which is used to control the pressure inside a transducer body. A filler material 18, such as Kevlar fiber, surrounds conductor wires 14 and vent tube 16 to fill the interior portion of cable 10. Surrounding filler material 18, just inside jacket 12, is a braided metallic shielding 20 used to insulate conductor wires 14 from external electromagnetic 16 interference.

Jacket 12 may be any strong, flexible insulating material and, in the past, has commonly been a material such as polyurethane. More recently, fluorinated ethylpropylene (FEP) resins such as Teflon, have been used to construct cable jackets because they have the advantage of being chemically inert (unlike polyurethane) and are, therefore, safe for use in situations involving drinking water. It is difficult, however, to bind other materials to the surface of FEP including materials which may be used to encapsulate or seal the cable end.

FIG. 2 illustrates schematically certain elements of the present invention. Prior to sealing end portions 21 of cable 10, cable 10 is passed through an opening in the front end of a cable head 22. Cable head 22 is slid up cable 10 and an O-ring 24, preferably made of Teflon, is then also slid up cable 10. An open or free end of cable 10 is then passed through an opening in the front end of a transducer body 26 which is also slid up cable 10 for a sufficient distance to leave at least several inches of cable exposed at the opposite end of transducer body 26. Both cable head 22 and transducer body 26 are preferably constructed of stainless steel.

A length (not shown) of jacket 12 and shielding 20 have been previously stripped to achieve the open end of cable 10 leaving conductor wires 14, vent tube 16 and filler 18 exposed. After stripping, a connecting lug 28 is secured to the end of cable 10 by tying filler 18 to lug 28 and vent tube 16 is temporarily plugged to prevent the entry of sealant into vent tube 16. As cable 10 is lowered into and raised from a well hole numerous times, jacket 12 will tend to stretch. A stretching force will also be placed on conductors 14 which are weaker than jacket 12. Consequently, conductors 14 will tend to break or be pulled from the transducer unless the force is relieved. Tying filler fibers 18 to lug 28 allows filler fibers 18 to absorb a certain amount of the stretching force and resist the balance of the force, thereby protecting conductors 14.

Figure 3:
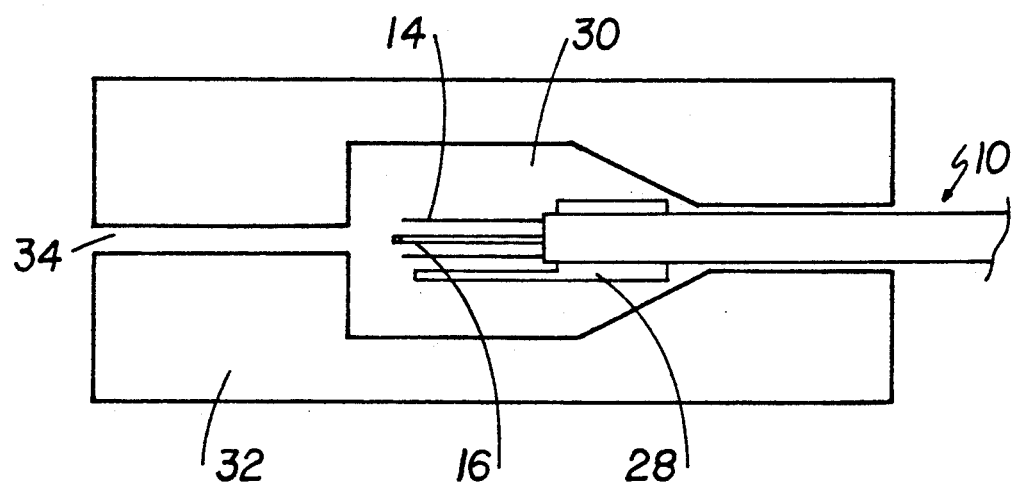
FIG. 3 illustrates schematically the pressure block of the present invention.

Referring to FIG. 3, the end of cable 10, along with lug 28, is positioned in a cavity 30 of the lower half of a pressure block 32. The upper half of the pressure block (not shown in FIG. 3) is secured to lower half 32. A liquid sealant is injected through a small opening 34 of pressure block 32, fills cavity 30 and enters the open end of cable 10. Under pressure, the sealant flows a predetermined distance into and along end portions of cable 10 thoroughly filling the interior space of cable 10 between strands of filler 18, conductor wires 14 and vent tube 16, while the jacket 12 remains in place and without breaching, or otherwise interrupting it. The injection may be accomplished using a syringe-type device that houses the sealant and in which a portion of the device is inserted through the opening 34.

When sufficient sealant has been injected, cable 10 is removed from pressure block 32 and the sealant is allowed to cure. Depending on the particular sealant used, heat may be applied to decrease the curing time. As illustrated in FIG. 2, after curing, vent tube 16 is unplugged. In the embodiment shown in FIG. 4, a transducer printed circuit board 36, containing the electronic components and circuitry which comprise the transducer, is secured to lug 28 using a fastener, such as a bolt and nut 38. In another embodiment (not shown), conductors 14 are coupled to the transducer which need not be secured to lug 28. Transducer body 26, disposed about the cable 10, is slid down to the end of cable 10 until it contacts lug 28 or surrounds printed circuit board 36. O-ring 24 is slid down cable 10 until it is positioned against transducer body 26 and cable head 22 is slid down cable 10 and threaded onto transducer body 26, compressing O-ring 24. Preferably, a second O-ring 25 is disposed between transducer body 26 and cable head 22 as further protection against intrusion by external fluids. A sensor tube (not shown), preferably made of stainless steel, is fitted into the open end of transducer body 26 like a piston and a compression O-ring (also not shown), preferably made of Teflon, seals the small gap between the sensor tube and transducer body 26.

In the preferred embodiment of the present invention the sealant is a silicone gel having an uncured viscosity of about 3.3 poise at 25° C. When cured, the silicone does not harden, but acquires a gel-like consistency allowing it to bend with cable 10 without compromising the seal. Additionally, such a material substantially reduces the number of air bubbles which may form. Its viscosity in the uncured state is sufficiently low that any air bubbles which may be present will float to the surface of the sealant before injection within about ten minutes after preparation. Therefore, the number of air bubbles in the seal itself is substantially reduced. Other materials with similar properties would also be acceptable. In tests, a sealant material provided along end portions 21 having a length of approximately one foot has withstood pressures of up to about 600 psi.

During the sealing operation, shielding 20 acts as a wick for the sealant. An important consequence of this feature is that the seal which eventually forms inside of cable 10 fills the entire interior space inside of jacket 12, including the space between strands of shielding 20. It has been found that an adequate seal can be formed if the sealant is injected into cable 10 at approximately 80 psi for approximately 5 minutes. When finally cured, the resulting seal is approximately 1 foot in length. Although a shorter seal may be sufficient for the purpose of preventing fluid from leaking into transducer body 26, a longer seal has the advantage that it enables the cable to be repaired without having to be resealed. For example, the entire cable head 22, O-ring 24 and transducer body 26 assembly may be cut off from the rest of cable 10 and removed for repair or replacement. Additional jacket 12 and braid 20 may be removed along with a portion of a seal in order to expose vent tube 16 and conductor wires 14. A new lug and transducer may then be coupled to cable 10 and the parts reassembled.

In operation, cable 10 and the coupled transducer are lowered into a drilled hole. If cable jacket 12 is pierced, ripped or otherwise broken, fluid, such as water, can enter into the interior space of cable 10. While the transducer and cable 10 are in place, any fluid which has invaded the interior space of cable 10 is stopped at the seal. Because braid 20 has thoroughly absorbed the sealant and is part of the seal, it does not serve as a wick for the fluid. Consequently, no fluid can travel through cable 10 past the sealant plug and into transducer body 26. Furthermore, compressed O-ring 24 prevents fluid from leaking into transducer body 26 from outside cable head 22.

As previously noted, if cable 10 is left downhole for an extended period of time (such as one year or more), it is likely that fluid will eventually penetrate jacket 12 and enter the interior space of cable 10. However, the seal formed by the injected sealant will prevent such fluid from entering transducer body 26. When cable 10 which has fluid in it is later removed from the well, the pressure inside cable jacket 12, due to the fluid inside of cable 10, becomes greater than the pressure which is exerted on the outside of cable 10. The pressure differential tends to stretch cable jacket 12 at the location where cable 10 enters cable head 22 because the pressure difference at that location is greater than anywhere else. Although such stretching opens a void between the inside of jacket 12 and the outside of the seal, any fluid which is able to go around the seal will be halted by O-ring 24 (inside of cable head 22) and, therefore, will not be able to reach transducer body 26.

Although the present invention has been described in detail, it should be understood the various changes, substitutions and alterations can be made herein without departing from the spirit and scope of the invention as defined by the appended claims.

What is claimed is:

1. A method for sealing end portions of a cable having a jacket and at least one conducting wire and in which the cable is connected to an apparatus adapted to be located under fluid, comprising:
    providing cable having a length and including an exterior jacket, an open and end portions extending from said open end with a conducting wire extending interiorly of said jacket and extending substantially the entire length of said cable while said end portions have a length less than said cable length;
    positioning said cable for receipt of a sealing material;
    providing said sealing material into said cable through said open end and along said cable end portions while portions of said jacket remain in place along said cable end portions, said sealing material terminating with said length of said end portions and the remaining length of said cable being void of said sealing material; and
    connecting an apparatus, after all of said sealing material has been provided to said cable, said cable end portions length being long enough to permit said apparatus to be removed, together with some of said cable end portions and then being able to reconnect said apparatus to remaining portions of said cable end portion without providing more sealing material whereby, after such reconnection, unwanted fluid is still substantially prevented from entering said apparatus.
2. A method, as claimed in claim 1, further including:

placing said apparatus and said cable end portions under fluid.

3. A method, as claimed in claim 1 wherein:
step of providing said cable includes stripping a length of said jacket to expose said conducting wire.

4. A method, as claimed in claim 1, wherein:
said step of positioning includes locating at least parts of said cable end portions in a pressure block having an opening and a cavity for receiving said sealing material.

5. A method, as claimed in claim 4, wherein:
said step of providing said sealing material includes injecting sealing material into said pressure block through said opening and in said cavity whereby at least some of said sealing material enters into said cable open end and passes along said cable end portions length.

6. A method, as claimed in claim 1, wherein:
said step of connecting includes attaching lug means to parts of said cable.

7. A method, as claimed in claim 1, wherein:
said apparatus includes a transducer body, a cable head and circuit means and said step of connecting includes connecting said conducting wire to said circuit means and positioning said transducer body outwardly of said cable open end after all of said sealing material is provided along said cable end portions length.

8. A method, as claimed in claim 1, further comprising:
locating a sealing ring about said jacket for use in reducing entry of unwanted fluid into interior portions of said apparatus.

9. A sealed cable assembly adapted to be connected to an apparatus, comprising:
a cable having a length and including an exterior jacket, an open end and end portions extending from said open end with a conducting wire extending internally of said jacket with said conducting wire extending substantially the length of said cable and said cable end portions having a length less than the length of said cable length;
a sealing material disposed interiorly of said jacket and along said end portions of said cable, said sealing material provided into said cable open end along all of said length of said cable end portions while portions of said jacket remain in place about said cable end portions and wherein said sealing material terminates with said length of said cable end portions and the remaining length of said cable being void of said sealing material;
wherein said length of said cable end portions is sufficient to permit the apparatus when installed to be removed from said cable, together with some of said cable end portions and to be subsequently reconnected to said cable without providing further sealing material whereby unwanted fluid is not able to enter the apparatus after said cable is reconnected to the apparatus; and
a sealing ring disposed outwardly of said jacket for also substantially preventing unwanted fluid from entering into interior portions of the apparatus.

10. An assembly, as claimed in claim 9, wherein:
said sealing material has a low viscosity in an uncured state and has a gel-like consistency in a cured state with said viscosity of said sealing material in said uncured state being about 3.3 poise.

11. An assembly, as claimed in claim 9, further comprising:
an apparatus including electrical means connected to said conducting wire and a transducer body with at least portions of said transducer body surround said open end of said cable and said apparatus further including a cable head with said sealing ring being disposed between said jacket and said cable head.

12. An assembly, as claimed in claim 9, wherein:
said jacket is substantially made of a fluorinated ethylpropylene resin including Teflon.

* * * * *